United States Patent
Li et al.

(10) Patent No.: US 11,300,585 B2
(45) Date of Patent: Apr. 12, 2022

(54) APPARATUS AND METHOD FOR MEASURING STRUCTURAL ANGULAR ACCELERATION BASED ON DYNAMIC CENTRIFUGAL FORCE MEASUREMENT

(71) Applicant: Dalian University of Technology, Dalian (CN)

(72) Inventors: Jianbo Li, Dalian (CN); Kai Yang, Dalian (CN); Shiyun Xiao, Dalian (CN); Runyu Mei, Dalian (CN); Zhiqiang Hu, Dalian (CN); Lei Zhou, Dalian (CN); Jun Liu, Dalian (CN); Zhiyuan Li, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 444 days.

(21) Appl. No.: 16/477,189

(22) PCT Filed: Jul. 5, 2018

(86) PCT No.: PCT/CN2018/094587
§ 371 (c)(1),
(2) Date: Jul. 11, 2019

(87) PCT Pub. No.: WO2020/006723
PCT Pub. Date: Jan. 9, 2020

(65) Prior Publication Data
US 2020/0233012 A1    Jul. 23, 2020

(51) Int. Cl.
*G01P 15/16* (2013.01)

(52) U.S. Cl.
CPC .................. *G01P 15/165* (2013.01)

(58) Field of Classification Search
CPC ........ G01P 15/165; G01P 15/08; G01P 15/02; G01P 15/034
See application file for complete search history.

(56) References Cited

U.S. PATENT DOCUMENTS 2,759,157 A * 8/1956 Wiancko ............. G01P 15/0888
73/514.03
3,546,925 A * 12/1970 Barton ...................... G21J 1/00
73/652

(Continued)

FOREIGN PATENT DOCUMENTS

| CN | 1844933 A | 10/2006 |
| CN | 101825429 A | 9/2010 |

(Continued)

*Primary Examiner* — Helen C Kwok
(74) *Attorney, Agent, or Firm* — Muncy, Geissler, Olds & Lowe, P.C.

(57) ABSTRACT

An apparatus and method for measuring a structural angular acceleration based on dynamic centrifugal force measurement belong to the technical field of angular acceleration measurement. The apparatus has a solid ball. The solid ball can move freely along the radial direction of the outer wall packaging hood. The elastic block is used as a stress base. A rod for lateral limit and connection is used for connecting the rigid block and a pulley and limiting the displacement of solid ball so that the solid ball can only move longitudinally along the apparatus. The rigid block can move freely due to the pulley. Measurement of a transient angular acceleration is converted into dynamic measurement of the centrifugal force of the solid ball. Through the above design, the dynamic angular acceleration of the structure caused by dynamic load can be relatively accurately calculated.

2 Claims, 3 Drawing Sheets

(56) References Cited

U.S. PATENT DOCUMENTS

| | | | | |
|---|---|---|---|---|
| 4,000,659 A | * | 1/1977 | Li | ............................. G01P 1/00 |
| | | | | 73/504.08 |
| 4,514,016 A | * | 4/1985 | Davis | ...................... F16C 11/12 |
| | | | | 384/2 |
| 2013/0211743 A1 | * | 8/2013 | Leroux | ............... G01M 5/0016 |
| | | | | 702/43 |

FOREIGN PATENT DOCUMENTS

| CN | 102262167 A | 11/2011 |
|---|---|---|
| CN | 106248996 A | 12/2016 |
| CN | 107462196 A | 12/2017 |
| JP | H0395467 A | 4/1991 |
| WO | WO2015107197 A1 | 7/2015 |

\* cited by examiner

APPARATUS AND METHOD FOR MEASURING STRUCTURAL ANGULAR ACCELERATION BASED ON DYNAMIC CENTRIFUGAL FORCE MEASUREMENT

TECHNICAL FIELD

The present invention belongs to the technical field of measurement of dynamic torsional deformation of engineering structures, relates to an apparatus and a method for measuring structural angular acceleration based on dynamic centrifugal force measurement, and is suitable for dynamic monitoring of transient angular acceleration in torsional dynamic response of civil engineering structures under the actions of earthquake, exploding and wind load.

BACKGROUND

In civil engineering, affected by the dynamic load such as wind, exploding and earthquake, the stiffness center and the direction of the resultant force of the acting force are often not coincident due to the asymmetry of the structure. The structure may generate rapid transient torsional movement around the stiffness center in the horizontal plane, which may affect the overall safety of the engineering structure in serious condition. Thus, the measurement of transient angular acceleration is of great significance to quantitative judgment of the torsional deformation and external torque size of the structure. However, because of the complexity of rapid transient deformation monitoring, especially because of a torsion angle which is a relative measurement value relative to the torsional center, under the influences of changeable external load, possible change of structural stiffness center, etc., in the current process of daily monitoring of engineering structure deformation, the mode of capturing the transient angular acceleration caused by the dynamic load is relatively primitive.

In the field of civil engineering, measurement of angular deformation is mainly based on the assumption of a structural rigid body. After the torsional center is determined, the linear accelerations of two remote reference points are measured firstly, and then the difference between the linear accelerations of the two points is calculated. Then, the angular acceleration of the structure is obtained by calculating the ratio of the difference to the distance between the two points. However, the premise of using this method is that the angular accelerations in various positions of the structure are consistent, but in the practical application of the civil engineering, the angular accelerations of the structure often vary with positions. Therefore, the method can only approximate the overall angular acceleration of the structure, and the positions of two reference points have a great influence on the measured angular acceleration. If the distribution feature of the angular accelerations in various positions of a certain plane of the structure is researched, this method is not applicable.

An angular rate gyroscope can also be used to measure the dynamic angular acceleration. The angular rate gyroscope is used to obtain the angular velocity, and then the angular acceleration can be obtained by differentiating the angular velocity. The gyroscope uses the angular momentum conservation principle. In general, it uses the property that when the combined external torque is zero, an object rotates at high speed to generate a large angular momentum and since the angular momentum remains constant, a rotary axis will always point steadily in one direction. However, the angular rate gyroscope has the following defects: 1) sufficient and relatively stable angular momentum is needed, otherwise it is not sufficient to maintain the rotation stability of the gyroscope; 2) the angular rate gyroscope needs to keep rotating all the time, which is not suitable for long-term monitoring of angular acceleration of buildings or structural foundations; and 3) the angular rate gyroscope is complex and precise in structure, which requires a lot of maintenance cost for long-term use. At present, a laser gyroscope and an optical fiber gyroscope that calculate the optical path difference, a micro-electromechanical system gyroscope (MEMS Gyroscope) based on physical Coriolis force, etc. have been developed, but these angular rate gyroscopes are mainly suitable for the fields of aviation, machinery and electrons, and are rarely used in complex and long-term severe environments of the civil engineering. At present, there are several other angular acceleration measurement instruments, such as piezoresistive angular acceleration sensor, liquid-ring angular acceleration sensor, piezoelectric angular acceleration sensor, etc., but they are often complex in structure and are also widely used in mechanical and electronic engineering.

In the process of long-term monitoring of structural deformation of buildings, dynamic changes such as structural torsion have the characteristics of suddenness, instantaneity and transience under complex and harsh environments of dynamic loads such as wind, exploding and earthquake. Now, it is urgent to have an instrument with simple principle, simple maintenance and convenient installation and capable of keeping standby for a long time, responding to excitation in time and rapidly obtaining the state of dynamic instantaneous angular acceleration at a certain position of the structure.

SUMMARY

In view of the problems in the prior art, the present invention provides an apparatus for measuring a structural angular acceleration based on dynamic centrifugal force measurement. The present invention adopts the basic principle: when a structure is torsional, an apparatus with mass which rotates with the structure produces a centrifugal force effect. The present invention converts measurement of transient angular acceleration into measurement of dynamic centrifugal force, and uses a strain foil to realize dynamic monitoring by converting the centrifugal force into stress measurement on the strain foil. The strain foil has the characteristics of stable operation, long-term work, good application effect under complicated working conditions, etc., thereby realizing real-time measurement for the angular acceleration caused by dynamic load under long-term monitoring conditions.

To achieve the above purpose, the present invention adopts the following technical solution:

An apparatus for measuring a structural angular acceleration based on dynamic centrifugal force measurement comprises internal core components, an outer wall packaging hood and a data acquisition and processing module. The internal core components are fixed to a structural outer surface to be measured through the outer wall packaging hood, and are connected with the data acquisition and processing module through a conducting wire; and the outer wall packaging hood is used for protecting the internal core components and limiting the displacement of a solid ball so that the solid ball can only move longitudinally along the apparatus.

The internal core components comprise the solid ball, a rigid block, an elastic block, a strain foil, a rod for lateral limit and connection, a pulley and a track. The solid ball is a spherical entity, has uniform material properties and has center of mass at the center of sphere. The solid ball comes into point contact with the outer wall packaging hood and the rigid block, and can move freely. One side of the rigid block comes into point contact with the solid ball, and the another side is connected with one end of the elastic block for transmitting the force between the solid ball and the elastic block. Two other sides of the rigid block are connected with the pulley through the rod; and the pulley is limited to the track. The other end of the elastic block is fixed to the inner wall of the outer wall packaging hood and is used as a stress base. The strain foil is fixed to the surface of the elastic block, and is connected with the data acquisition and processing module through a conducting wire.

A method for measuring structural angular acceleration using the apparatus is provided. The method uses the strain foil to realize dynamic monitoring, thereby relatively accurately calculating the angular acceleration caused by dynamic load such as wind, exploding and earthquake in the structure. The method comprises the following steps:

First step, fixing the apparatus for measuring the structural angular acceleration to the structural surface to be measured; enabling a head of the apparatus to face a structural torsional center if the solid ball in the apparatus is deemed as the head;

Second step, under the structural torsion condition, the solid ball will act on the rigid block because of the centrifugal force effect. Then the rigid block will transmit the force to the elastic block because an ideal rigid block will not deform. Therefore, measuring, by the strain foil, the strain generated after the elastic block is stressed; and obtaining the size of the centrifugal force F from the strain e obtained by the strain foil:

$$F = \varepsilon \times E \times A$$

where E is an elastic modulus of the elastic block; A is the cross-sectional area of the elastic block; $\varepsilon$ is the strain of the elastic block, and $\varepsilon = \varepsilon_{measured} - \varepsilon_0$, where $\varepsilon_{measured}$ is a directly measured strain of the elastic block, and $\varepsilon_0$ is an initial strain of the elastic block caused by uneven structural surface.

Third step, converting measurement of a transient angular acceleration into measurement of dynamic centrifugal force in the present invention, and calculating angular velocity $\omega$ of structural torsion according to the formula:

$$\omega = \sqrt{\frac{F}{m \times r}}$$

where m is the mass of the solid ball; $\omega$ is the angular velocity of structural torsion, and is also the angular velocity of the solid ball along with structural torsion; r is a distance between the structural torsional center and the solid ball; F is the centrifugal force of the solid ball.

Fourth step, calculating the angular acceleration $\alpha$ of structural torsion using formula (6), i.e., $$\alpha = \frac{d\omega}{dt} = \frac{\omega_2 - \omega_1}{t_2 - t_1} \quad (6)$$

where $t_1$, $t_2$ are any two moments of infinite proximity, and $\omega_1$, $\omega_2$ are angular velocities of structural torsion corresponding to $t_1$, $t_2$.

Combining the above four steps to directly obtain:

$$\alpha = \frac{(\sqrt{\varepsilon_2} - \sqrt{\varepsilon_1}) \times \sqrt{\frac{E \times A}{m \times r}}}{t_2 - t_1} \quad (7)$$

where $\alpha$ is a structural instantaneous angular acceleration, $\varepsilon_1$, $\varepsilon_2$ are strains of the elastic block corresponding to $t_1$, $t_2$, and the physical significance of other parameters is as described above.

The present invention has the following beneficial effects: the present invention has relatively low maintenance cost, and can monitor structural sudden torsion and structural rotation status in real time for a long time. The present invention is not easy to be affected by an external environment and can rapidly obtain the dynamic instantaneous angular acceleration at a certain position of the structure in a complex environment.

Figure 1:
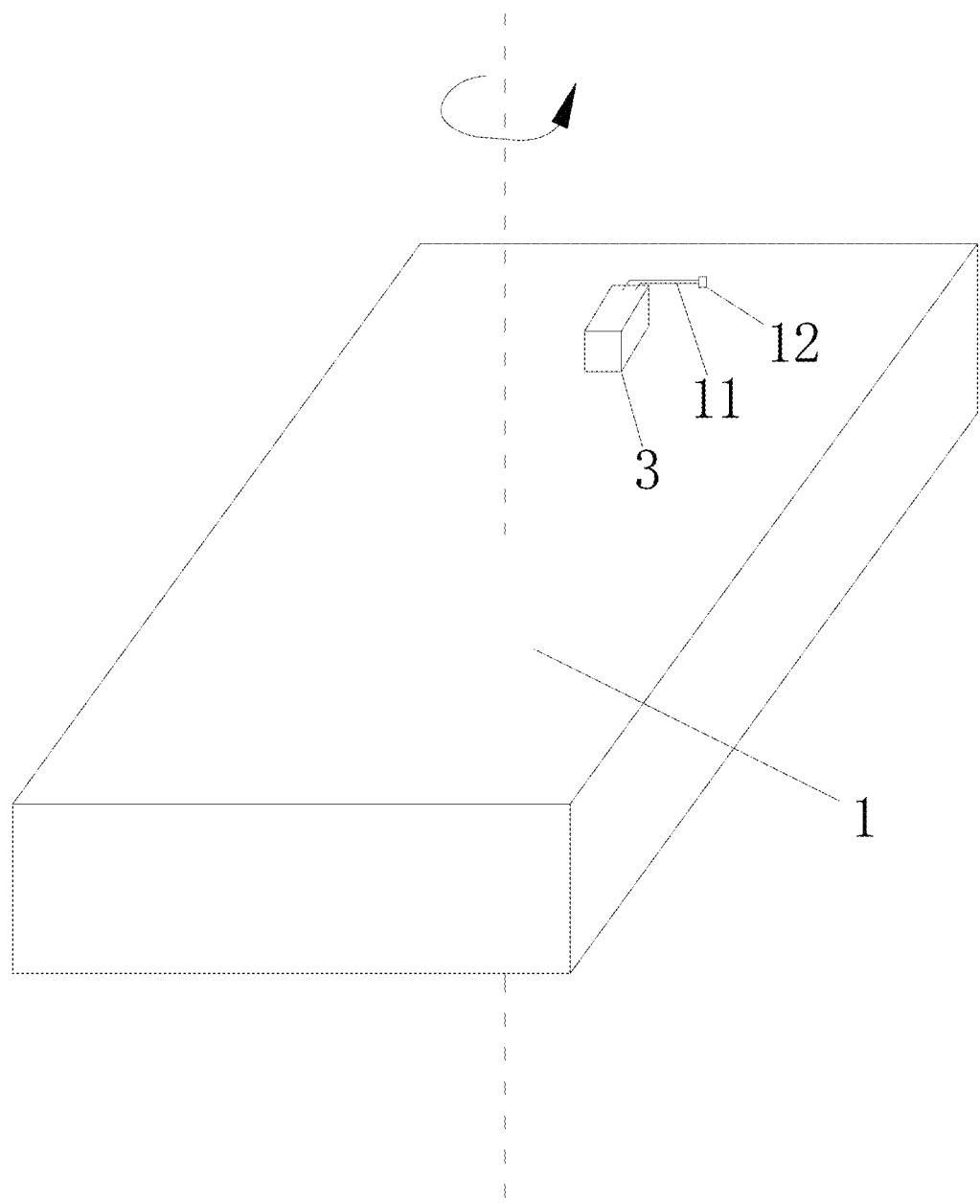
FIG. 1 is a stereographic schematic diagram when an apparatus is fixed to a structure.
Figure 2:
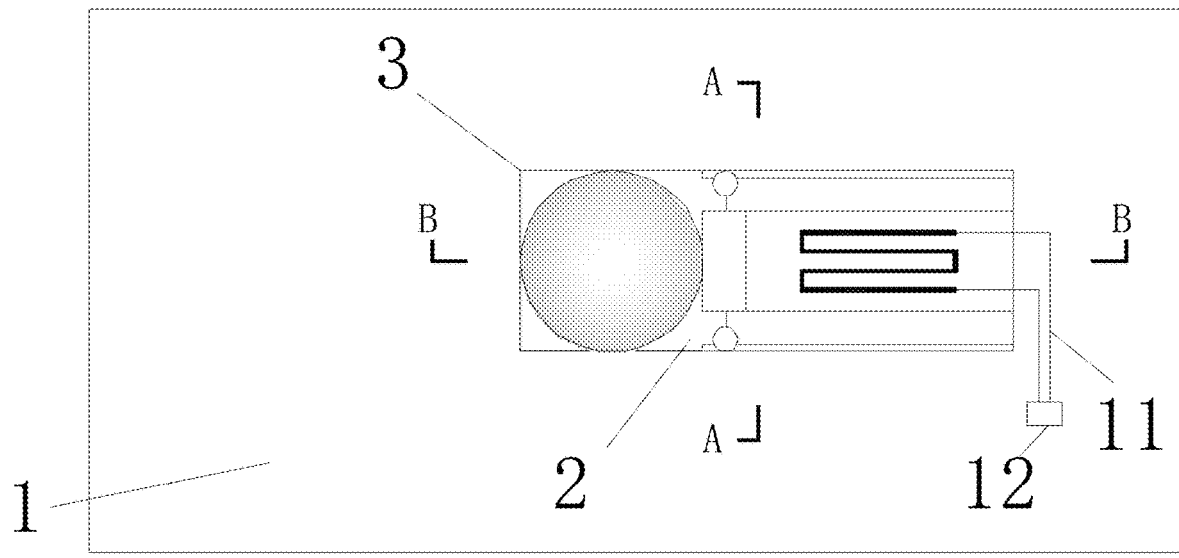
FIG. 2 is a plan schematic diagram when an apparatus is fixed to a structural surface.

In the figures: 1 structural external surface; 2 internal core component; 3 outer wall packaging hood; 4 solid ball; 5 rigid block; 6 elastic block; 7 strain foil; 8 rod for lateral limit and connection; 9 pulley; 10 track; 11 conducting wire; and 12 data acquisition and processing module.

DETAILED DESCRIPTION

Specific embodiments of the present invention are described below in detail in combination with the technical solution and drawings.

An apparatus for measuring a structural angular acceleration based on dynamic centrifugal force measurement is provided. The apparatus comprises internal core components 2, an outer wall packaging hood 3 and a data acquisition and processing module 12. The internal core components 2 are fixed to a structural outer surface 1 to be measured through the outer wall packaging hood 3; the internal core components 2 are connected with the data acquisition and processing module 12 through a conducting wire 11; and the outer wall packaging hood 3 is used for protecting the internal core components 2 and limiting the displacement of solid ball 4 so that the solid ball 4 can only move longitudinally along the apparatus.

Figure 3:
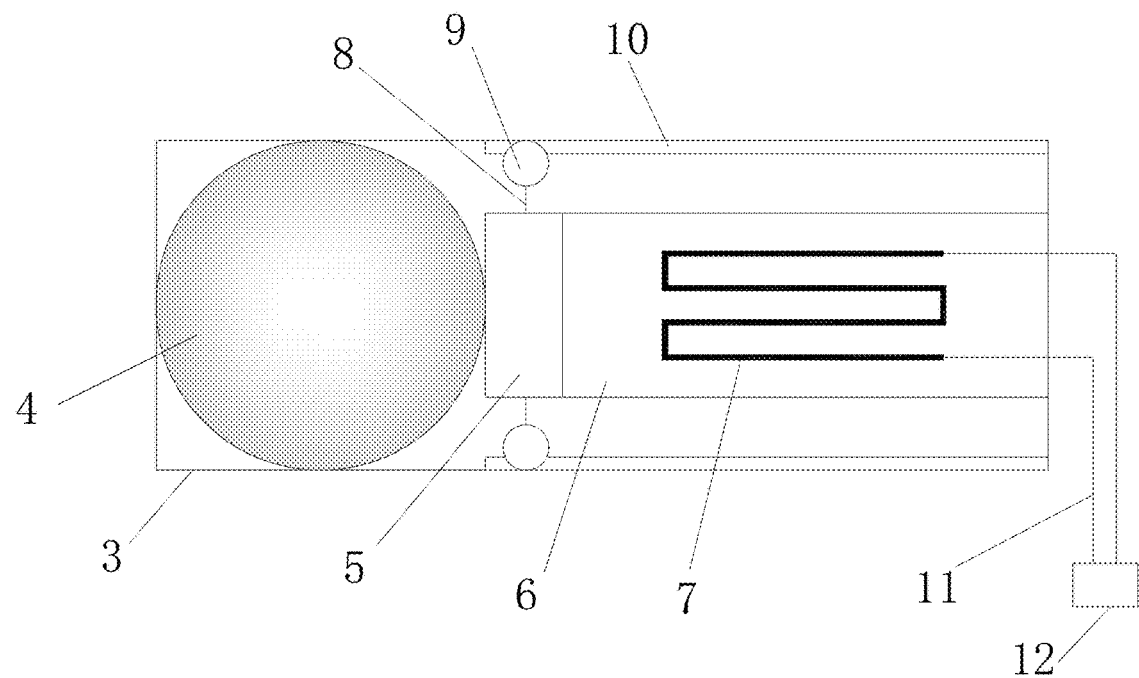
FIG. 3 is a plan schematic diagram of internal core components of an apparatus.
Figure 4:
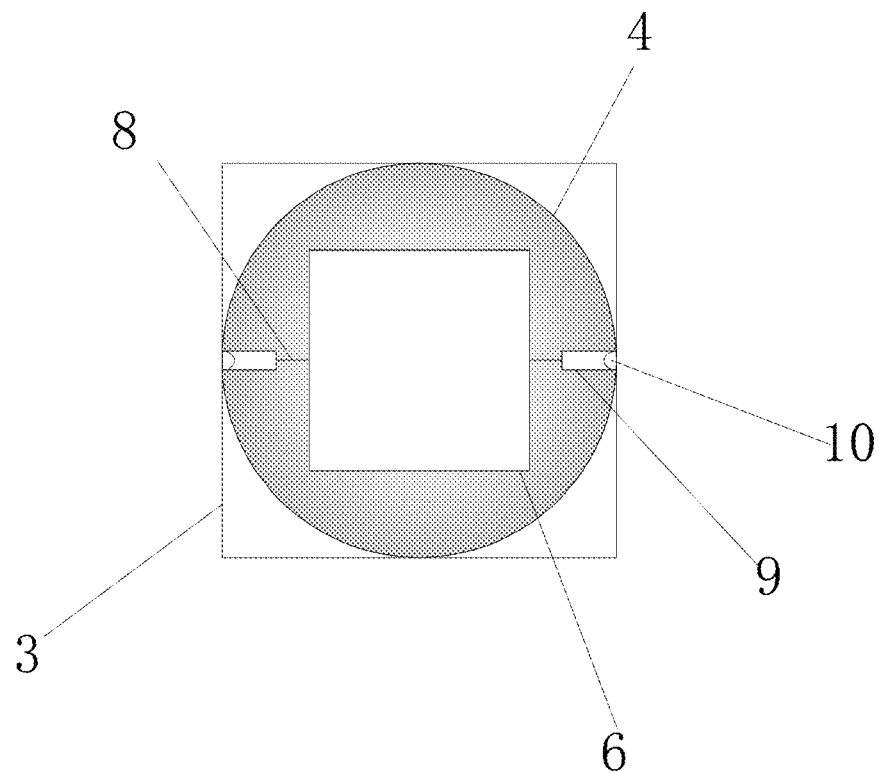
FIG. 4 is a schematic diagram of A-A section of internal core components of an apparatus.
Figure 5:
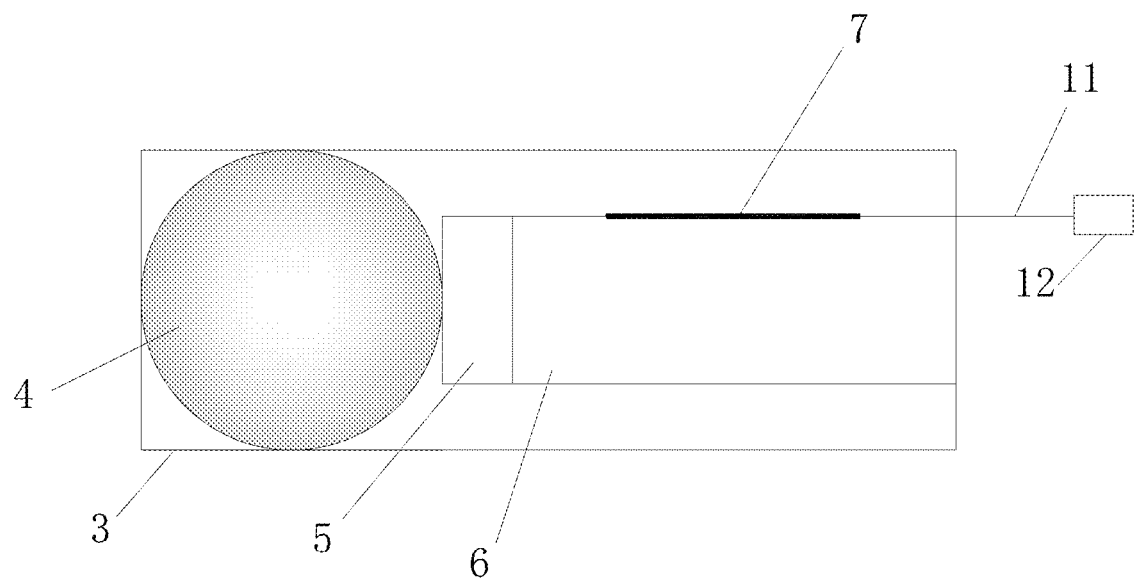
FIG. 5 is a schematic diagram of B-B section of internal core components of an apparatus.

The internal core components 2 comprise the solid ball 4, a rigid block 5, an elastic block 6, a strain foil 7, a rod for lateral limit and connection 8, a pulley 9 and a track 10. The solid ball 4 is a spherical entity, has uniform material properties and has center of mass at the center of sphere. The solid ball 4 comes into point contact with five surfaces of the inner walls of the outer wall packaging hood 3 (based on FIG. 3, including upper inner wall, lower inner wall, front inner wall, rear inner wall and left inner wall) and the rigid block 5; the solid ball 4 can move freely, but is limited by the outer wall packaging hood 3 and the rigid block 5; and in the absence of external force, the solid ball 4 is stationary relative to the outer wall packaging hood 3. One end (left side surface) of the rigid block 5 comes into point contact with the solid ball 4, and the opposite other end (right side surface) is connected with one end of the elastic block 6. The rigid block 5 is used to transmit the force between the solid ball 4 and the elastic block 6. Two other opposite ends (upper side surface and lower side surface in FIG. 3) of the rigid block 5 are connected with the pulley 9 through the rod for lateral limit and connection 8; the pulley 9 is limited to the track 10; and the track 10 is fixed to the inner wall of the outer wall packaging hood 3 to ensure that the rigid block 5 can longitudinally move freely under stress. The other end of the elastic block 6 is fixed to the right inner wall of the outer wall packaging hood 3 and is used as a stress base; The strain foil 7 is fixed to the surface of the elastic block 6, and is connected with the data acquisition and processing module 12 through a conducting wire 11 for detecting the strain of the elastic block 6; and a centrifugal force produced by the solid ball when the structure is torsional is calculated.

A method for measuring structural angular acceleration using the apparatus comprises the following steps:

First step, fixing the apparatus for measuring the structural angular acceleration to the structural outer surface 1 to be measured; enabling a head to face a structural torsional center if the solid ball 4 in the apparatus is deemed as the heads;

Second step, under the structural torsion condition, the solid ball 4 will act on the rigid block 5 because of the centrifugal force effect. Then the rigid block 5 will transmit the force to the elastic block 6 because an ideal rigid block 5 will not deform. Therefore, measuring, by the strain foil 7, the strain generated after the elastic block 6 is stressed; and obtaining the size of the centrifugal force F from the strain ε obtained by the strain foil 7:

$$F = \varepsilon \times E \times A \tag{1}$$

where E is an elastic modulus of the elastic block 6 in the apparatus; A is the cross-sectional area of a plane of point contact between the elastic block 6 and the solid ball 4 in the apparatus, and is also numerically equal to the cross-sectional area of the elastic block 6 in the apparatus; ε is the strain of the elastic block 6, and $\varepsilon = E_{measured} - \varepsilon_0$, where $\varepsilon_{measured}$ is a directly measured strain of the elastic block 6, and $\varepsilon_0$ is an initial strain caused by uneven structural surface.

A derivation process is as follows: a material mechanics formula $$\frac{\sigma}{\varepsilon} = E \tag{2}$$

where σ is a stress of the cross section of an elastic object, ε is a strain produced due to the stress of the elastic object, and E is an elastic modulus of the material.

$$\sigma = \frac{F}{A} \tag{3}$$

where F is an external force of the cross section of the elastic block, and A is the cross section acted upon by an external force.

Substituting formula (3) into (2) to obtain a relational expression (1).

Third step, converting measurement of a transient angular acceleration into measurement of dynamic centrifugal force, and calculating angular velocity ω of structural torsion:

$$\omega = \sqrt{\frac{F}{m \times r}} \tag{4}$$

where m is the mass of the solid ball 4; ω is the angular velocity of structural torsion, and is also the angular velocity of the solid ball 4 which is along with structural torsion; r is a distance between the structural torsional center and the solid ball 4; F is the centrifugal force of the solid ball 4.

Derivation process: when an object makes circular motion around a point, a centrifugal force is produced, making the object tend to leave the center of rotation. In the present invention, ω is the angular velocity of structural torsion, and is also the rotational angular velocity of the solid ball 4; m is the mass of the solid ball 4; r is a distance between the structural torsional center and the solid ball 4; F is the centrifugal force of the solid ball 4. Then $$F = m\omega^2 r \tag{5}$$

Obtaining a relational expression (4) from (5).

Fourth step, calculating the angular acceleration α of structural rotation using formula (6), i.e., $$\alpha = \frac{d\omega}{dt} = \frac{\omega_2 - \omega_1}{t_2 - t_1} \tag{6}$$

where $t_1$, $t_2$ are any two moments of infinite proximity, and $\omega_1$, $\omega_2$ are angular velocities of structural torsion corresponding to $t_1$, $t_2$.

Combining the above four steps to directly obtain:

$$\alpha = \frac{(\sqrt{\varepsilon_2} - \sqrt{\varepsilon_1}) \times \sqrt{\frac{E \times A}{m \times r}}}{t_2 - t_1} \tag{7}$$

where α is a structural instantaneous angular acceleration, $\varepsilon_1$, $\varepsilon_2$ are strains of the elastic block corresponding to $t_1$, $t_2$, and the physical significance of other parameters is as described above.

Derivation process:

$$\alpha = \frac{d\omega}{dt} = \frac{\omega_2 - \omega_1}{t_2 - t_1}$$

$$= \frac{\sqrt{\frac{F_2}{m \times r}} - \sqrt{\frac{F_2}{m \times r}}}{t_2 - t_1} = \frac{\sqrt{\frac{\varepsilon_2 \times E \times A}{m \times r}} - \sqrt{\frac{\varepsilon_1 \times E \times A}{m \times r}}}{t_2 - t_1}$$

$$= \frac{(\sqrt{\varepsilon_2} - \sqrt{\varepsilon_1}) \times \sqrt{\frac{E \times A}{m \times r}}}{t_2 - t_1}$$

$F_1$, $F_2$ are external forces of the cross section of the elastic block corresponding to $t_1$, $t_2$, and are numerically equal to the centrifugal force of the solid ball; and the physical significance of other parameters is as described above.

Because the transient angular acceleration at a point can be determined by the present invention, on one hand, the angular acceleration in a key position of the structure can be accurately measured; and on the other hand, the whole angular acceleration of the structure can also be determined by measuring at multiple points.

The invention claimed is:

1. An apparatus for measuring a structural angular acceleration based on dynamic centrifugal force measurement, wherein the apparatus for measuring the structural angular acceleration comprises internal core components (2), an outer wall packaging hood (3) and a data acquisition and processing module (12); the internal core components (2) are fixed to a structural outer surface (1) to be measured through the outer wall packaging hood (3); the internal core components (2) are connected with the data acquisition and processing module (12); the outer wall packaging hood (3) is used for protecting the internal core components (2) and limiting the displacement of a solid ball (4) so that the solid ball (4) can only move longitudinally along the apparatus;

the internal core components (2) comprise the solid ball (4), a rigid block (5), an elastic block (6), a strain foil (7), a rod for lateral limit and connection (8), a pulley (9) and a track (10); the solid ball (4) is a spherical entity, has uniform material properties and has center of mass at a center of sphere; the solid ball (4) comes into point contact with inner walls of the outer wall packaging hood (3) and the rigid block (5); the solid ball (4) can move freely, but are limited by the outer wall packaging hood (3) and the rigid block (5); in the absence of an external force, the solid ball (4) is stationary relative to the outer wall packaging hood (3); one end of the rigid block (5) comes into point contact with the solid ball (4), and the opposite other end is connected with one end of the rigid block (5) for transmitting the force between the solid ball (4) and the elastic block (6); the rigid block (5) is used to transmit the force between the solid ball (4) and the elastic block (6); two other ends of the rigid block (5) are connected with the pulley (9) through the rod for lateral limit and connection (8); the pulley (9) is limited to the track (10); the track (10) is fixed to the inner walls of the outer wall packaging hood (3) to ensure that the rigid block (5) can move freely under stress; the other end of the elastic block (6) is fixed to a right inner wall of the outer wall packaging hood (3) and is used as a stress base; the strain foil (7) is fixed to a surface of the elastic block (6), and is connected with the data acquisition and processing module (12) for detecting a strain of the elastic block (6); and a centrifugal force produced by the solid ball (4) when the apparatus for measuring the structural angular acceleration is torsional and is calculated.

2. A method for measuring structural angular acceleration using the apparatus according to claim 1, the method comprising the following steps:

first step, fixing the apparatus for measuring the structural angular acceleration to the structural outer surface (1) to be measured; enabling a head to face a structural torsional center if the solid ball (4) in the apparatus is deemed as the heads;

second step, under a structural torsion condition, the solid ball (4) will act on the rigid block (5) because of a centrifugal force effect; then the rigid block (5) will transmit the force to the elastic block (6) because the rigid block (5) will not deform; measuring, by the strain foil (7), the strain generated after the elastic block (6) is stressed; and obtaining the size of a centrifugal force F from the strain c obtained by the strain foil (7):

$$F = \varepsilon \times E \times A \quad (1)$$

where E is an elastic modulus of the elastic block (6) in the apparatus; A is the cross-sectional area of a plane of point contact between the elastic block (6) and the solid ball (4) in the apparatus, and is also numerically equal to the cross-sectional area of the elastic block (6) in the apparatus; $\varepsilon$ is the strain of the elastic block (6), and $\varepsilon = \varepsilon_{measured} - \varepsilon_0$, where $\varepsilon_{measured}$ is a directly measured strain of the elastic block (6), and $\varepsilon_0$ is an initial strain of the elastic block (6) caused by uneven structural surface;

third step, converting measurement of a transient angular acceleration into measurement of dynamic centrifugal force, and calculating angular velocity $\omega$ of structural torsion:

$$\omega = \sqrt{\frac{F}{m \times r}} \quad (4)$$

where m is the mass of the solid ball (4); $\omega$ is the angular velocity of structural torsion, and is also the angular velocity of the solid ball (4) which is along with structural torsion; r is a distance between a structural torsional center and the center of sphere of the solid ball (4); F is the centrifugal force of the solid ball (4);

fourth step, calculating the angular acceleration $\alpha$ of structural rotation using formula (6), $$\alpha = \frac{d\omega}{dt} = \frac{\omega_2 - \omega_1}{t_2 - t_1} \quad (6)$$

where $t_1$, $t_2$ are any two moments of infinite proximity, and $\omega_1$, $\omega_2$ are angular velocities of structural torsion corresponding to $t_1$, $t_2$;

combining the above four steps to directly obtain:

$$\alpha = \frac{(\sqrt{\varepsilon_2} - \sqrt{\varepsilon_1}) \times \sqrt{\frac{E \times A}{m \times r}}}{t_2 - t_1} \quad (7)$$

where $\alpha$ is a structural instantaneous angular acceleration, $\varepsilon_1$, $\varepsilon_2$ are strains of the elastic block corresponding to $t_1$, $t_2$, and the physical significance of other parameters is as described above.

* * * * *